(12) United States Patent
Armstrong et al.

(10) Patent No.: US 8,619,796 B2
(45) Date of Patent: *Dec. 31, 2013

(54) FORWARDING DATA FRAMES WITH A DISTRIBUTED FIBER CHANNEL FORWARDER

(75) Inventors: William J. Armstrong, Rochester, MN (US); Claude Basso, Nice (FR); Josep Cors, Rochester, MN (US); Daniel G. Eisenhauer, Austin, TX (US); Carlos F. Fuente, Hampshire (GB); Kyle A. Lucke, Oronoco, MN (US); Theodore B. Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/765,128

(22) Filed: Apr. 22, 2010

(65) Prior Publication Data

US 2011/0261826 A1     Oct. 27, 2011

(51) Int. Cl.
*H04L 12/56* (2012.12)

(52) U.S. Cl.
USPC .......... 370/401; 370/392; 370/390; 370/389; 709/230

(58) Field of Classification Search
USPC .................. 370/389, 401, 390, 392; 709/230
See application file for complete search history.

(56) References Cited

U.S. PATENT DOCUMENTS

| | | |
|---|---|---|
| 5,901,140 A | 5/1999 | Van As et al. |
| 6,802,068 B1 | 10/2004 | Guruprasad |
| 6,807,172 B1 | 10/2004 | Levenson et al. |
| 6,980,547 B1 | 12/2005 | Gally et al. |
| 7,023,857 B1 | 4/2006 | Chiussi et al. |
| 7,107,360 B1 | 9/2006 | Phadnis et al. |
| 7,138,733 B2 | 11/2006 | Sanders et al. |
| 7,167,922 B2 | 1/2007 | Narayanan |
| 7,281,039 B1 | 10/2007 | Salkewicz |
| 7,751,416 B2 | 7/2010 | Smith et al. |
| 7,756,027 B1 | 7/2010 | Reddy et al. |
| 7,831,759 B2 | 11/2010 | Boyd et al. |
| 7,876,746 B1 | 1/2011 | Pannell et al. |
| 7,889,728 B2 | 2/2011 | Arad et al. |
| 7,992,149 B2 | 8/2011 | Carollo et al. |

(Continued)

FOREIGN PATENT DOCUMENTS

| | | |
|---|---|---|
| CN | 101110730 A | 1/2008 |
| CN | 101442502 A | 5/2009 |

(Continued)

OTHER PUBLICATIONS

IBM Patent Application ROC920090056US1 entitled "Hardware Accelerated Data Frame Forwarding," filed by William J. Armstrong on Apr. 22, 2010.

(Continued)

*Primary Examiner* — Dang Ton
*Assistant Examiner* — Mewale Ambaye
(74) *Attorney, Agent, or Firm* — Toler Law Group

(57) ABSTRACT

Systems and methods to forward data frames are described. A particular method may include associating a fiber channel forwarder with a bridge element. The fiber channel forwarder may be one of a plurality of fiber channel forwarders coupled to the bridge element. A data frame received at the bridge element may be forwarded to the fiber channel forwarder.

20 Claims, 6 Drawing Sheets

(56) References Cited

U.S. PATENT DOCUMENTS

| | | |
|---|---|---|
| 8,054,832 B1 | 11/2011 | Shukla et al. |
| 8,085,791 B1 | 12/2011 | Aggarwal et al. |
| 8,090,805 B1 | 1/2012 | Chawla et al. |
| 8,121,126 B1 | 2/2012 | Moisand et al. |
| 8,190,960 B1 | 5/2012 | Bahadur et al. |
| 8,194,534 B2 | 6/2012 | Pandey et al. |
| 8,271,680 B2 | 9/2012 | Salkewicz |
| 8,345,536 B1 | 1/2013 | Rao et al. |
| 8,358,661 B2 | 1/2013 | Armstrong et al. |
| 8,369,296 B2 | 2/2013 | Armstrong et al. |
| 8,379,642 B2 | 2/2013 | Armstrong et al. |
| 8,385,356 B2 | 2/2013 | Armstrong et al. |
| 8,447,909 B2 | 5/2013 | Corrigan et al. |
| 2003/0037163 A1 | 2/2003 | Kitada et al. |
| 2003/0236852 A1 | 12/2003 | Fernandes et al. |
| 2004/0037279 A1 | 2/2004 | Zelig et al. |
| 2004/0179476 A1 | 9/2004 | Kim et al. |
| 2004/0199698 A1 | 10/2004 | Bolian et al. |
| 2006/0023708 A1 | 2/2006 | Snively et al. |
| 2006/0149886 A1 | 7/2006 | Chen et al. |
| 2006/0248158 A1 | 11/2006 | Ha et al. |
| 2006/0251067 A1* | 11/2006 | DeSanti et al. ............... 370/389 |
| 2007/0047536 A1 | 3/2007 | Scherer et al. |
| 2007/0067432 A1 | 3/2007 | Tarui et al. |
| 2007/0111414 A1 | 5/2007 | Chaudhry et al. |
| 2007/0147368 A1 | 6/2007 | Desai et al. |
| 2007/0184572 A1 | 8/2007 | Kohli et al. |
| 2007/0260910 A1 | 11/2007 | Jain et al. |
| 2007/0266179 A1 | 11/2007 | Chavan et al. |
| 2007/0268830 A1 | 11/2007 | Li et al. |
| 2007/0299987 A1 | 12/2007 | Parker et al. |
| 2008/0002579 A1 | 1/2008 | Lindholm et al. |
| 2008/0056300 A1 | 3/2008 | Williams |
| 2008/0069100 A1 | 3/2008 | Weyman et al. |
| 2008/0109565 A1 | 5/2008 | Ajanovic et al. |
| 2008/0159260 A1 | 7/2008 | Vobbilisetty et al. |
| 2008/0159277 A1 | 7/2008 | Vobbilisetty et al. |
| 2008/0275975 A1* | 11/2008 | Pandey et al. .................. 709/223 |
| 2009/0037977 A1* | 2/2009 | Gai et al. ........................... 726/1 |
| 2009/0161674 A1 | 6/2009 | Bou-Diab et al. |
| 2009/0161692 A1 | 6/2009 | Hirata et al. |
| 2009/0201928 A1 | 8/2009 | Chen et al. |
| 2009/0213869 A1 | 8/2009 | Rajendran et al. |
| 2009/0245791 A1* | 10/2009 | Thaler et al. .................... 398/45 |
| 2009/0252181 A1 | 10/2009 | Desanti |
| 2009/0254677 A1 | 10/2009 | Desanti |
| 2009/0265501 A1 | 10/2009 | Uehara et al. |
| 2009/0276526 A1 | 11/2009 | Carlson et al. |
| 2009/0323518 A1 | 12/2009 | Rose et al. |
| 2010/0036995 A1 | 2/2010 | Nakayama et al. |
| 2010/0067374 A1 | 3/2010 | Elangovan et al. |
| 2010/0085966 A1 | 4/2010 | Samuels et al. |
| 2010/0107162 A1 | 4/2010 | Edwards et al. |
| 2010/0128605 A1* | 5/2010 | Chavan et al. ............. 370/230.1 |
| 2010/0150174 A1 | 6/2010 | Bhide et al. |
| 2010/0257263 A1 | 10/2010 | Casado et al. |
| 2010/0257269 A1 | 10/2010 | Clark |
| 2011/0055433 A1 | 3/2011 | Kishore et al. |
| 2011/0061094 A1 | 3/2011 | Salkewicz |
| 2011/0069710 A1 | 3/2011 | Naven et al. |
| 2011/0085546 A1* | 4/2011 | Capello et al. ................ 370/389 |
| 2011/0085557 A1 | 4/2011 | Gnanasekaran et al. |
| 2011/0103391 A1 | 5/2011 | Davis et al. |
| 2011/0153715 A1 | 6/2011 | Oshins et al. |
| 2011/0213868 A1 | 9/2011 | Chen et al. |
| 2011/0243134 A1 | 10/2011 | Armstrong et al. |
| 2011/0258340 A1 | 10/2011 | Armstrong et al. |
| 2011/0261687 A1 | 10/2011 | Armstrong et al. |
| 2011/0262134 A1 | 10/2011 | Armstrong et al. |
| 2011/0264610 A1 | 10/2011 | Armstrong et al. |
| 2011/0320671 A1 | 12/2011 | Armstrong et al. |
| 2012/0027014 A1 | 2/2012 | Mack-Crane et al. |
| 2012/0036236 A1 | 2/2012 | Richardson et al. |
| 2012/0147743 A1 | 6/2012 | Singh et al. |
| 2012/0209940 A1 | 8/2012 | Kidambi et al. |
| 2012/0236858 A1 | 9/2012 | Armstrong et al. |
| 2013/0117469 A1 | 5/2013 | Corrigan et al. |

FOREIGN PATENT DOCUMENTS

| | | | |
|---|---|---|---|
| WO | 2006093929 A2 | | 9/2006 |
| WO | WO 2009/085536 | * | 9/2009 |
| WO | 2010024993 A1 | | 3/2010 |

OTHER PUBLICATIONS

Cisco Systems, "Integrating the Cisco Catalyst Blade Switch 3130 for Dell PowerEdge M1000e Blade Enclosure into the Cisco Data Center Network Architecture—Design Guide", Oct. 2007, retrieved from the Internet: http://cisco.com/en/US/prod/collateral/sw, 29 pages.

Cisco Systems, "The Adaptive Architecture for the Data Center Network", 2007, 3 pages.

Hufferd, John L., "Proxy Based Shortcut", Huffered Enterprises, Oct. 7, 2009, 21 pages.

U.S. Appl. No. 13/352,952 entitled "Requesting Multicast Membership Information in a Distributed Switch in Response to a Miss Event", filed Jan. 18, 2012 by Debra L. Angst et al., 38 pages.

U.S. Appl. No. 13/352,973 entitled "Managing a Global Forwarding Table in a Distributed Switch", filed Jan. 18, 2012 by Debra L. Angst et al., 39 pages.

U.S. Appl. No. 12/751,187; Non-Final Office Action dated May 30, 2012; 15 pages.

U.S. Appl. No. 12/751,187; Notice of Allowance dated Oct. 26, 2012; 7 pages.

U.S. Appl. No. 12/751,249; Final Office Action dated Apr. 10, 2013; 16 pages.

U.S. Appl. No. 12/751,249; Non-Final Office Action dated Oct. 12, 2012; 18 pages.

U.S. Appl. No. 12/763,306; Non-Final Office Action dated Feb. 27, 2012; 20 pages.

U.S. Appl. No. 12/763,306; Notice of allowance dated Aug. 1, 2012; 6 pages.

U.S. Appl. No. 12/763,306; Notice of Allowance dated Mar. 14, 2013; 5 pages.

U.S. Appl. No. 12/763,306; Notice of Allowance dated Nov. 14, 2012; 5 pages.

U.S. Appl. No. 12/763,323; Non-Final Rejection dated Mar. 28, 2012; 11 pages.

U.S. Appl. No. 12/763,323; Notice of Allowance dated Sep. 14, 2012; 7 pages.

U.S. Appl. No. 12/765,109; Final Office Action dated Jun. 29, 2012; 13 pages.

U.S. Appl.No. 12/765,109; Non-Final Office Action dated Feb. 8, 2013; 14 pages.

U.S. Appl.No. 12/765,109; Non-Final Office Action dated Mar. 9, 2012; 12 pages.

U.S. Appl. No. 12/767,174; Non-Final Office Action dated Feb. 23, 2012; 12 pages.

U.S. Appl. No. 12/767,174; Notice of Allowance dated May 30, 2012; 5 pages.

U.S. Appl. No. 12/767,174; Notice of Allowance dated Oct. 5, 2012; 5 pages.

U.S. Appl. No. 12/767,481; Non-Final Office Action dated Feb. 22, 2012; 10 pages.

U.S. Appl. No. 12/767,481; Notice of Allowance dated Jun. 1, 2012; 5 pages.

U.S. Appl. No. 12/767,481; Notice of Allowance dated Oct. 11, 2012; 5 pages.

U.S. Appl. No. 12/767,506; Non-Final Office Action dated Jan. 18, 2013; 7 pages.

U.S. Appl. No. 12/767,543; Final Office Action dated May 30, 2013; 17 pages.

U.S. Appl. No. 12/767,543; Non-Final Office Action dated Oct. 22, 2012; 15 pages.

U.S. Appl. No. 12/839,099; Final Office Action dated Oct. 25, 2012; 8 pages.

(56) References Cited

OTHER PUBLICATIONS

U.S. Appl. No. 12/839,099; Non-Final Office Action dated July 9, 2012; 7 pages.
U.S. Appl. No. 12/839,099; Notice of Allowance dated Jan. 11, 2013; 5 pages.
U.S. Appl. No. 13/485,766; Non-Final Office Action dated Dec. 13, 2012; 10 pages.
International Search Report and Written Opinion of the ISA dated May 30, 2013—International Application No. PCT/IB2012/057522, 10 pages.

* cited by examiner

FORWARDING DATA FRAMES WITH A DISTRIBUTED FIBER CHANNEL FORWARDER

I. FIELD OF THE DISCLOSURE

The present disclosure relates generally to data communications, and more specifically, to forwarding Fiber Channel over Ethernet data frames between server computers.

II. BACKGROUND

Server computers may compete for access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

For example, data frames formatted according to the Fiber Channel over Ethernet (FCoE) standard use a Fiber Channel Forwarder to participate in protocol and data exchange between initiator information technology elements (ITEs) and target ITEs. The Fiber Channel Forwarder conventionally executes the Fiber Channel Initialization Protocol and the initiator ITE to target ITE Fiber Channel Protocol connections. The Fiber Channel Initialization Protocol may include processes to discover and initialize FCoE capable entities connected to an Ethernet cloud. The Fiber Channel Protocol is a transport protocol that is configured to transport Small Computer System Interface (SCSI) commands over Fiber Channel networks. SCSI is a set of standards for physically connecting and transferring data between computers and peripheral devices. The reliance on the Fiber Channel Forwarder may cause a processing bottleneck in large scale, or highly-integrated, FCoE networks, such as in Storage Area Networks (SANs).

III. SUMMARY OF THE DISCLOSURE

In a particular embodiment, a method for forwarding data frames is disclosed. The method includes associating a fiber channel forwarder with a bridge element. The fiber channel forwarder may be one of a plurality of fiber channel forwarders coupled to the bridge element. A data frame received at the bridge element may be forwarded to the fiber channel forwarder.

In another embodiment, an apparatus is disclosed that includes a plurality of fiber channel forwarders each configured to encapsulate and de-encapsulate data frame data. A bridge element in communication with the plurality of fiber channel forwarders is configured to receive programming associated with a fiber channel forwarder of the plurality of fiber channel forwarders and to forward a data frame to the fiber channel forwarder.

In another embodiment, a program product includes program code configured to be executed by a processor to associate a fiber channel forwarder with a bridge element. The fiber channel forwarder may be one of a plurality of fiber channel forwarders coupled to the bridge element. A data frame received at the bridge element may be forwarded to the fiber channel forwarder. The program product further includes a computer readable medium bearing the program code.

At least one of the embodiments may reduce potential bottlenecks and facilitate efficient processing. Fiber Channel over Ethernet may be supported, and an embodiment of a system may be scalable to include hundreds or more server computers with direct connectivity. For example, select data frames may be forwarded using fiber channel forwarders.

Features that characterize embodiments of the invention are set forth in the claims annexed hereto and forming a further part hereof. However, for a better understanding of embodiments of the invention, and of the advantages and objectives attained through its use, reference should be made to the Drawings and to the accompanying descriptive matter in which there are described exemplary embodiments of the invention.

IV. BRIEF DESCRIPTION OF THE DRAWINGS

V. DETAILED DESCRIPTION

Data frame communication may be improved by distributing the processing of Fiber Channel over Ethernet (FCoE) transactions among multiple, distributed Fiber Channel Forwarders using a network switch, or bridge element. In at least one embodiment, multiple computing devices may perceive they are communicating with a single Fiber Channel Forwarder. For example, FCoE formatted data frames from multiple computing devices may be addressed to a global Fiber Channel Forwarder address. The data frames and associated processing may be selectively distributed among multiple Fiber Channel Forwarders. For example, a data frame arriving at a bridge element of a distributed virtual bridge may be routed to a Fiber Channel Forwarder that is nearest to the bridge element or that has otherwise been associated with the bridge element.

An embodiment of a system may include a multi-rack, interconnected network switch configuration. The network may be segmented into Virtual Local Area Networks (VLANs), each representing an isolated Storage Area Network (SAN). Each SAN may include an initiator information technology element (ITE) and a target ITE (e.g., a storage ITE). The ITEs may connect to an Ethernet network via a Converged Network Adapter. The Converged Network Adapter (e.g., a single root I/O virtualization adapter) may implement FCoE protocol.

The distributed Fiber Channel Forwarders may be represented as a common, global Fiber Channel Forwarder. The global Fiber Channel Forwarder may automatically configure the distributed Fiber Channel Forwarders and related initiator and target ITE Ethernet port settings that relate to FCoE management. The distributed Fiber Channel Forwarders may be networked within a common, integrated network over a management plane. The global Fiber Channel Forwarder may automate the translation, setup and management of FCoE parameters. The management may include Media Access Control (MAC) address assignments and data segregation.

An embodiment of a bridge element may work in combination with the distributed Fiber Channel Forwarders to achieve routing efficiencies in firmware and hardware, which may provide a larger bandwidth and faster processing than software applications. The bridge element may perform snooping operations to identify data frames that are addressed using the global Fiber Channel Forwarder address. The data frames may be forwarded by the bridge element to one or more appropriate distributed Fiber Channel Forwarders.

Figure 1:
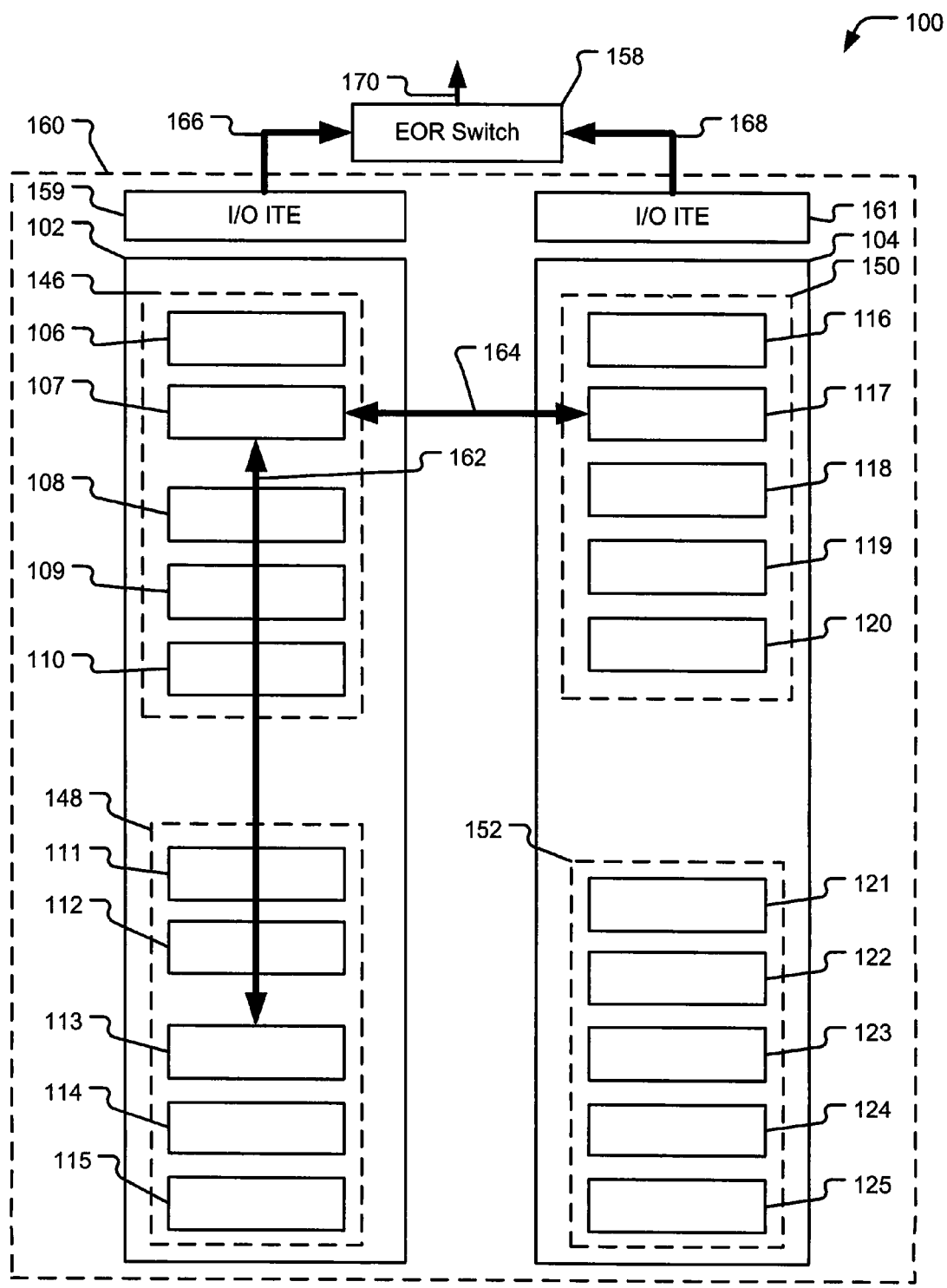
FIG. 1 is a block diagram of an embodiment of a networked computing system configured to allow direct communication between server computers housed within different racks and chassis of blade server computers.

Referring to the drawings, FIG. 1 shows an illustrative embodiment of a highly integrated system 100 configured to forward data frames using a distributed virtual bridge 160. The distributed virtual bridge 160 may extend across server computers 106-125, chassis 146, 148, 150, 152, and racks 102, 104 to provide data link layer (i.e., Layer 2) switching between bridge elements. The bridge elements may provide a frame-based, Ethernet-like interface. The interface may facilitate lossless, point-to-point, in-order frame delivery between server computers 106-125 of different racks 102, 104 or chassis 146, 148, 150, 152 (i.e., east-west connectivity) with reduced redundancy and latency.

The system 100 further includes an end-of-rack switch 158 and input/output (I/O) server ITEs 159, 161 that enable north-south connectivity. The I/O server ITEs 159, 161 may enable uplink connectivity to the external Ethernet network (or other network) for the server computers 106-125 housed within the racks 102, 104.

An arrow 164 of FIG. 1 represents direct east-west connectivity and the flow of data frames between server computers located in different racks 102, 104 of the system 100 (e.g., without using a top of rack or chassis switch). An arrow 162 represents direct east-west connectivity across different chassis 146, 148 of the rack 102.

The system 100 of FIG. 1 may enable direct connectivity between server computers of different racks or chassis. To accommodate the relatively high level of system integration, data frames may be forwarded to distributed Fiber Channel Forwarders. The associated distribution of processing and data may streamline the routing of data frames. The inclusion of the Fiber Channel Forwarders within the distributed virtual bridge 160 may reduce contention for resources and increase data frame traffic flow.

Figure 2:
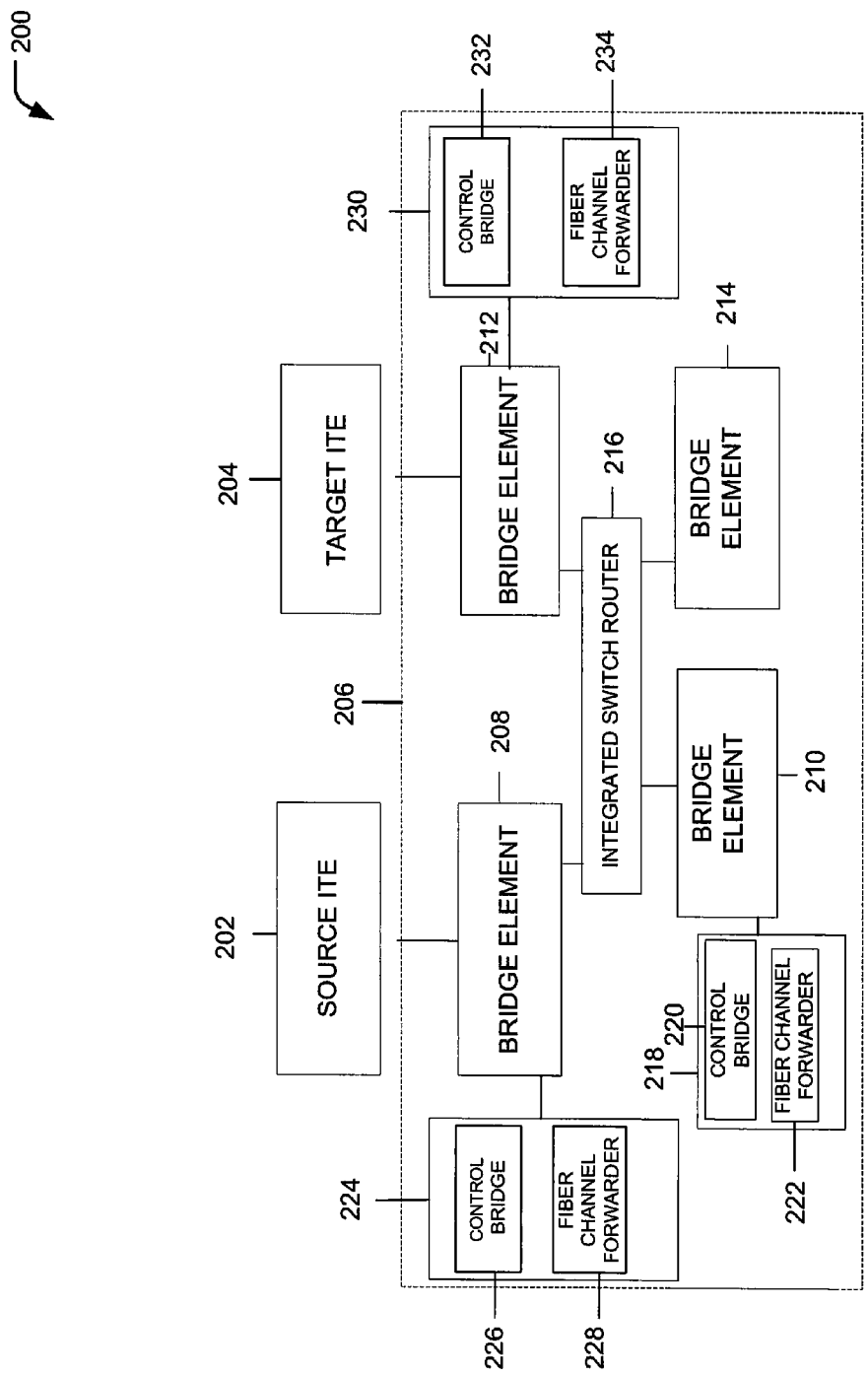
FIG. 2 is a block diagram of a particular embodiment of a system having hardware configured to forward data frames to multiple, distributed Fiber Channel Forwarders.

FIG. 2 shows a particular illustrative embodiment of a highly integrated computer system configured to efficiently distribute data frames to multiple, distributed Fiber Channel Forwarders. More particularly, the system 200 may include a source ITE 202 that is coupled to a target ITE 204 via a distributed virtual bridge 206. The distributed virtual bridge 206 may include multiple bridge elements 208, 210, 212, and 214 that are coupled via an integrated switch router 216. In one respect, the distributed virtual bridge 206 may comprise a Converged Enhanced Ethernet (CEE) switch.

The distributed virtual bridge 206 may include a controlling bridge 220 and a Fiber Channel Forwarder 222 of an I/O blade computing device 218. The I/O blade computing device 218 may be directly coupled to the bridge element 210. For example, a cable may connect the I/O blade computing device 218 and the bridge element 210. The controlling bridge 220 may be configured to interface with and program the bridge elements 208, 210, 212, and 214.

The bridge element 208 may be directly coupled to a computing device 224 (e.g., an I/O blade device) that includes a controlling bridge 226 and a Fiber Channel Forwarder 228. A computing device 230 may be directly coupled to the bridge element 212 and may include a controlling bridge 232 and a Fiber Channel Forwarder 234. The Fiber Channel Forwarders 222, 228, and 234 may be coupled to, or otherwise in communication with one another and the bridge elements 208, 210, 212, and 214.

The source ITE 202 and the target ITE 204 may perceive that they are communicating with a single Fiber Channel Forwarder. For example, all FCoE communications from the ITEs 202, 204 may be addressed using a global Fiber Channel Forwarder address. However, the data frames and associated processing may be selectively distributed among multiple Fiber Channel Forwarders 222, 228, and 234. For example, a data frame arriving at the bridge element 208 may be routed to the Fiber Channel Forwarder 228 that has been associated with the bridge element 208. In at least one embodiment, the Fiber Channel Forwarder that is nearest to the bridge element may be programmed with or otherwise associated with the bridge element.

In at least one embodiment, the Fiber Channel Forwarder 228 may be selected based upon predetermined criteria. For example, the Fiber Channel Forwarder 228 may be selected based upon a proximity to the bridge element 208. That is, the Fiber Channel Forwarder 228 may be selected because it is the nearest Fiber Channel Forwarder to the bridge element 208.

One or more controlling bridges 222, 226, and 232, or another remote entity, may associate a Fiber Channel Forwarder with a bridge element. The controlling bridge 226 may further program the bridge element 208 forward a data frame to the Fiber Channel Forwarder 228 in response to identifying the global Fiber Channel Forwarder address within the data frame. The global Fiber Channel Forwarder address may also be stored at the bridge elements 208, 210, 212, and 214 to identify data frames to be forwarded to the distributed Fiber Channel Forwarders 222, 228, and 234. The address of the associated Fiber Channel Forwarder 228 may be stored at the bridge element 208.

FIG. 2 thus shows a highly integrated system 200 having bridge elements 208, 210, 212, and 214 that may forward data frames to distributed Fiber Channel Forwarders 222, 228, and 234. Because the distributed virtual bridge 206 may include domain knowledge of the bridge elements 208, 210, 212, and 214, the controlling bridge 220, and the Fiber Channel Forwarder 222, the bridge element 208 may snoop to internally redirect a data frame away from the Fiber Channel Forwarder 222. Occurrences of processing bottlenecks and resultant latency may consequently be reduced at the Fiber Channel Forwarder 222.

Figure 3:
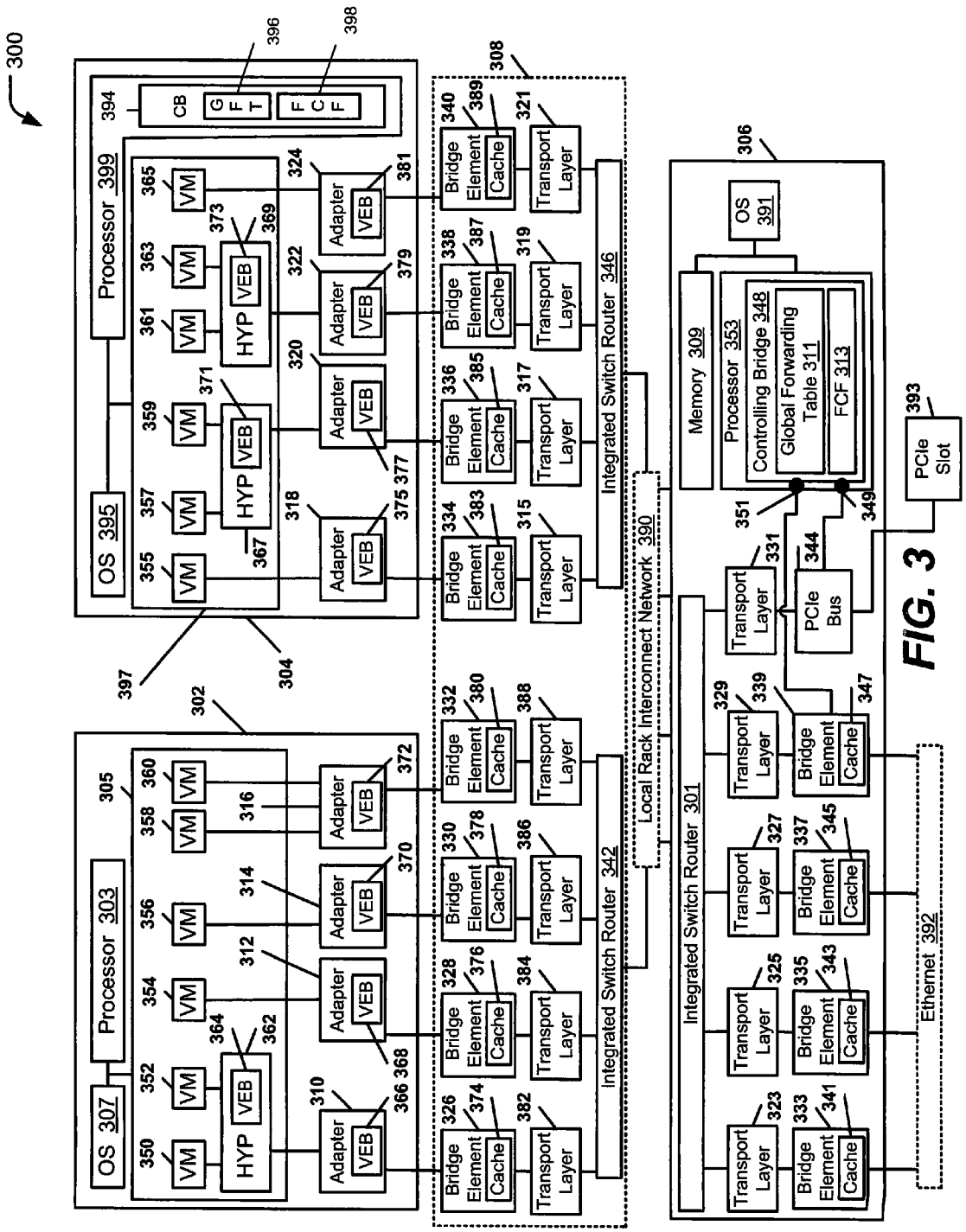
FIG. 3 is a diagram of a particular embodiment of a system configured to forward data frames using a distributed virtual bridge.

Referring to FIG. 3, another particular illustrative embodiment of a highly integrated system 300 configured to forward data frames is depicted. FIG. 3 generally shows a computer system 300 configured to forward data frames using a distributed virtual bridge 308. The distributed virtual bridge 308 may selectively forward the data frames to distributed Fiber Channel Forwarders 313, 398.

The distributed virtual bridge 308 may be similar to the distributed virtual bridge 206 of FIG. 2. The system 300 includes a first server computer 302 and a second server computer 304 that are both coupled to an I/O blade device 306 via the distributed virtual bridge 308. The server computers 302, 304 and the I/O blade device 306 may be housed within separate chassis and racks.

The distributed virtual bridge 308 may be coupled to multiple adapters 310, 312, 314, 316, 318, 320, 322, and 324. The adapters 310, 312, 314, 316, 318, 320, 322, and 324 may be located within or may be coupled to the server computers 302, 304. The distributed virtual bridge 308 may use multiple access points, or bridge elements 326, 328, 330, and 332-440 to couple to the server computers 302, 304. For example, a microchip that includes the bridge elements 326, 328, 330, and 332 may be cabled or otherwise coupled to a port of the server computer 302 that includes the adapter 310. As explained herein, the distributed virtual bridge 308 may functionally supplant chassis switches and top of rack switches with a frame-based network fabric that functions in a similar fashion to an Ethernet network.

One or more transport layer modules 382, 384, 386, and 388 coupled to the bridge elements 326, 328, 330, and 332 may provide a frame-based, Ethernet-like interface to one or more integrated switch routers 342. The transport layer module 382 may be configured to deconstruct a transmission of data frames so that packet information may be evenly distributed across links to a local rack interconnect 390. The data frames may not be serialized upon leaving the transport layer module 382. A receiving transport layer module 323 may serialize the data frames to achieve reliable, in-order delivery. If the receiving transport layer module 323 determines that data frame information is missing, the transport layer module 323 may initiate a process to recover the missing data. The translation process may be accomplished in hardware, which may provide a larger bandwidth and faster processing than software applications. The transport layer modules 382, 384, 386, and 388, the integrated switch router 342, and the local rack interconnect network 390 may combine to include an underlying lossless, point-to-point communication network (i.e., an integrated switch router network) between the server computers 302, 304 and the I/O blade device 306.

The bridge elements 326, 328, 330, and 332 may function as data link layer (i.e., Layer 2) bridge forwarders within the distributed virtual bridge 308. In particular embodiments, the bridge elements 326, 328, 330, and 332 may comprise a switch or a router device. The bridge elements 326, 328, 330, and 332 may include learned (e.g., received and stored) cached address data used to forward data frames throughout the distributed virtual bridge 308. The learned address data may correspond to one or both of a destination address and a source address associated with a data frame.

When the bridge element 326 does not include address data pertinent to a source or destination address of a received data frame, the bridge element 326 may query a controlling bridge 348 for the address data. The controlling bridge 348 may include a global forwarding table 311 that includes stored address data. The stored address data may be continuously updated by the bridge elements 326, 328, 330, and 332. For example, a bridge element 326 may send an update message to the controlling bridge 348 in response to learning an updated or new MAC address. A corresponding MAC address in the global forwarding table 311 may be subsequently updated.

Conversely, the address data of the global forwarding table 311 may be used to update the bridge elements 326, 328, 330, and 332. For example, the controlling bridge 348 may respond to a query from the bridge element 326 with requested address data. The bridge element 326 may cache the received address data for future use.

The first server computer 302 may comprise a blade server computer, such as the server computer 202 shown in FIG. 2. The first server computer 302 may include one or more virtual machines (VMs) 350, 352, 354, 356, 358, and 360. A virtual machine may include a software implementation of a computer and may execute programs in a manner similar to a physical machine.

FIG. 3 shows an illustrative hypervisor 362 that is coupled to both the virtual machine 350 and the virtual machine 352. The hypervisor 362 may include platform virtualization software that allows multiple operating systems to run concurrently on the first server computer 302. The hypervisor 362 may include a hypervisor virtual bridge 364 that allows direct communication between the virtual machines 350, 352 without traversal of an external network. In one embodiment, the hypervisor virtual bridge 364 may register address information with the controlling bridge 348.

The server computer 302 may include at least one processor 303 coupled to a memory 305. The processor 303 may represent one or more processors (e.g., microprocessors), and the memory 305 may represent random access memory (RAM) devices comprising the main storage of the server computer 302, as well as supplemental levels of memory, e.g., cache memories, non-volatile or backup memories (e.g., programmable or flash memories), read-only memories, etc. In addition, the memory 305 may be considered to include memory storage physically located in the server computer 302 or on another server computer 304 coupled to the server computer 302 via the distributed virtual bridge 308.

The first server computer 302 may operate under the control of an operating system (OS) 307 and may execute or otherwise rely upon various computer software applications, components, programs, objects, modules, and data structures, such as the virtual machines 350, 352, 354, 356, 358, and 360. Moreover, various applications, components, programs, objects, modules, etc. may also execute on one or more processors in another device coupled to the server computer 302 (e.g., in a distributed computing environment, where computing processes may be allocated to multiple server computers).

The first server computer 302 may include adapters 310, 312, 314, and 316, such as converged network adapters. A converged network adapter may include a single root I/O virtualization (SR-IOV) adapter, such as a Peripheral Component Interconnect Express (PCIe) adapter that supports Converged Enhanced Ethernet (CEE). The adapters 310, 312, 314, and 316 may be used to implement an FCoE protocol. Each adapter 310, 312, 314, and 316 may be coupled to one or more of the virtual machines 350, 352, 354, 356, 358, and 360. The adapters 310, 312, 314, and 316 may facilitate shared access of the virtual machines 350, 352, 354, 356, 358, and 360. While the adapters 310, 312, 314, and 316 are shown in FIG. 3 as being included within the server computer 302, adapters of another embodiment may include physically distinct devices that are separate from the server computers 302, 304.

Each adapter 310, 312, 314, and 316 may include a converged adapter virtual bridge 366, 368, 370, and 372. The converged adapter virtual bridges 366, 368, 370, and 372 may facilitate sharing of the adapters 310, 312, 314, and 316 by coordinating access by the virtual machines 350, 352, 354, 356, 358, and 360. Each converged adapter virtual bridge 366, 368, 370, and 372 may recognize data flows included within its domain. A recognized domain address may be routed directly, without processing or storage outside of the domain of the particular converged adapter virtual bridge 366, 368, 370, and 372. Each adapter 310, 312, 314, and 316 may include one or more CEE transmit ports that couple to one of the bridge elements 326, 328, 330, and 332. In another embodiment, bridge elements may be co-located with the adapters, and coupling between adapters and the bridge elements may not be Ethernet connections.

The bridge elements 326, 328, 330, and 332 may be configured to forward data frames throughout the distributed virtual bridge 308. The bridge elements 326, 328, 330, and 332 may thus function as access points for the distributed virtual bridge 308 by translating between Ethernet and the integrated switch router 342. The bridge elements 326, 328, 330, and 332 may not include buffers and may support CEE at boundaries of the distributed virtual bridge 308. In another embodiment, the bridge elements 326, 328, 330, and 332 may include buffers.

Each bridge element 326, 328, 330, and 332 of the distributed virtual bridge 308 may include a forwarding cache 374, 376, 378, and 380. A forwarding cache 374, 376, 378, and 380 may include a lookup table that stores address data used to forward data frames that are received by the bridge elements 326, 328, 330, and 332. For example, the bridge element 326 may compare address data associated with a received data frame to the address data stored within the forwarding cache 374.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 313, as set by an administrator or computing system. The Fiber Channel Forwarder 313, or FCoE switch, may facilitate connectivity between FCoE initiators and Fiber Channel fabrics. To illustrate, an FCoE data frame sent from the first virtual machine 358 and intended for a second virtual machine 363 may be addressed to the Fiber Channel Forwarder 313 in accordance with the FCoE standard. According to standard routing procedures, the Fiber Channel Forwarder 313 may receive and readdress the FCoE data frame for forwarding to the virtual machine 363.

The MAC address of the Fiber Channel Forwarder 313 may have been learned by the first server computer 302 during a discovery phase, when the Fiber Channel Forwarder 313 establishes communications with networked devices. During the discovery phase, the second server computer 304 may respond to broadcast queries from the first server computer 302. The Fiber Channel Forwarder 313 may discover the second server computer 304 from the query responses. After the discovery phase, a login phase may be initiated. A MAC address of the server computer 304 may be reassigned by the Fiber Channel Forwarder 313. The reassigned MAC address may be used for subsequent routing and communications between the server computers 302, 304. The Fiber Channel Forwarder 313 may facilitate storage of MAC addresses assigned to the server computers 302, 304.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 308. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 374, 376, 378, and 380 of the distributed virtual bridge 308 may have a format similar to the global forwarding table 311 of the controlling bridge 348. The forwarding caches 374, 376, 378, and 380 may have smaller memory capacities than the global forwarding table 311. The forwarding caches 374, 376, 378, and 380 may further be updated with address data learned from data frames that flow through the bridge elements 326, 328, 330, and 332.

The address data may additionally be updated with address data received from the global forwarding table 311. Invalid or changed address data that is updated within one or more of the forwarding caches 374, 376, 378, and 380 of the bridge elements 326, 328, 330, and 332 may be communicated to the global forwarding table 311 of the controlling bridge 348. For example, the bridge element 326 may learn a new MAC address of a newly added device that is configured to receive from or send data to the distributed virtual bridge 308.

The bridge element 326 may verify that a source MAC address included within a received data frame is allowed at a port by checking a list stored within a memory. The bridge element 326 may send a registration message to the controlling bridge 348 to update the global forwarding table 311 with the verified MAC address. The bridge element 326 may further store the MAC address within the forwarding cache 374. In another example, the bridge element 326 may identify a MAC address that is infrequently used. This infrequently used MAC address may be removed from the forwarding cache 374 to make storage room available for other MAC addresses. The bridge element 326 may send an update message to the controlling bridge 348 to have the MAC address removed from the global forwarding table 311.

Address data stored within the global forwarding table 311 may be communicated to one or more forwarding caches 374, 376, 378, and 380 of the distributed virtual bridge 308. For example, the bridge element 326 may receive a data frame that includes a destination MAC address that is not stored within the forwarding cache 374. To obtain information for forwarding the data frame, the bridge element 326 may send a query to a bridge element 339 configured to access the controlling bridge 348. The bridge element 339 may search the global forwarding table 311 for address data associated with the destination MAC address. If the address data is found, the bridge element 339 may forward the MAC address through the distributed virtual bridge 308 to the querying bridge element 326. The bridge element 326 may store the MAC address as address data within the forwarding cache 374. As with the global forwarding table 311, the address data included within the forwarding caches 374, 376, 378, and 380 of the distributed virtual bridge 308 may include both internal address information, as well as addresses that are external to the system 300.

Each of the bridge elements 326, 328, 330, and 332 may be connected to one or more transport layer modules 382, 384, 386, and 388. The transport layer modules 382, 384, 386, and 388 may include buffering used for attachment to the integrated switch router 342. The transport layer modules 382, 384, 386, and 388 may further provide a frame-based, Ethernet-like interface to the integrated switch router 342.

The transport layer modules 382, 384, 386, and 388 may each include a shared buffer used to transmit frames across the integrated switch router 342. Additional buffers of the transport layer modules 382, 384, 386, and 388 may be used to receive data frames from the integrated switch router 342. The buffers may be divided into different virtual lanes. Virtual lanes may include logically separated paths for data frame traffic flowing between a bridge element and a transport layer module. For example, there may be four virtual lanes between the bridge element 326 and the transport layer module 382. The transport layer modules 382, 384, 386, and 388 may include logic to recover from faulty microchips and links between a source and a destination. The transport layer modules 382, 384, 386, and 388 may maintain a strict ordering of packets within a particular virtual lane regardless of each data frame's path through the local rack interconnect network 390 and the computer system 300.

The integrated switch router 342 may communicate with the transport layer modules 382, 384, 386, and 388 and may facilitate routing and packet delivery to and from the local rack interconnect network 390. The local rack interconnect network 390 may include links to the bridge elements 326, 328, 330, and 332 located within the same chassis and rack, as well as links to the bridge elements 334-440 in different chassis and racks. The local rack interconnect network 390 may include point-to-point connections, or pipes, between the bridge elements 326, 328, 330, 332, and 333-440 of the distributed virtual bridge 308 with no frame loss and with in-order frame delivery.

The second server computer 304 may include a server computer similar to the first server computer 302 and may be similar to the server computer 216 of FIG. 2. As such, the second server computer 304 may be located within a different chassis and rack than the first server computer 302. Similar to the first server computer 302, the second server computer 304 may include a processor 399 coupled to a memory 397 and to an operating system 395. The processor 399 may include a controlling bridge (CB) 394, a global forwarding table (GFT) 396, and a Fiber Channel Forwarder (FCF) 398. The second server computer 304 may further include virtual machines 355, 357, 359, 361, 363, and 365.

A hypervisor 367 may be coupled to the virtual machines 357, 359. The hypervisor 367 may include a hypervisor virtual bridge 371 that allows direct communication between the virtual machines 357, 359. A hypervisor virtual bridge 373 of a hypervisor 369 coupled to the virtual machines 361, 363 may facilitate direct communication between the virtual machines 361, 363. For example, the hypervisor virtual bridges 371, 373 may register address data with the controlling bridge 348.

The second server computer 304 may also include one or more adapters 318, 320, 322, and 324, such as converged CEE network adapters. Each adapter 318, 320, 322, and 324 may be coupled to one or more of the virtual machines 355, 357, 359, 361, 363, and 365. The adapters 318, 320, 322, and 324 may each include a converged adapter virtual bridge 375, 377, 379, and 381. The converged adapter virtual bridges 375, 377, 379, and 381 may facilitate sharing of the adapters 318, 320, 322, and 324 by coordinating virtual machine access. The adapters 318, 320, 322, and 324 may each couple to one or more of the bridge elements 334, 336, 338, and 340 of the distributed virtual bridge 308. Each adapter 318, 320, 322, and 324 may include one or more CEE transmit ports that couple to one of the bridge elements 334, 336, 338, or 340.

Each bridge element 334, 336, 338, and 340 may include a forwarding cache 383, 385, 387, and 389 that includes address data used to forward data frames that are received by the bridge elements 334, 336, 338, and 340. The bridge elements 334, 336, 338, and 340 may each be connected to one or more transport layer modules 315, 317, 319, and 321. The transport layer modules 315, 317, 319, and 321 may include buffering used for the attachment to the integrated switch router 346. The transport layer modules 315, 317, 319, and 321 may further provide a frame-based, Ethernet-like interface to the integrated switch router 346 and may maintain packet ordering. A portion of the distributed virtual bridge 308 shown in FIG. 3 as located above the local rack interconnect network 390 and as associated with the server computers 302, 304 may be referred to as a north portion. The bridge elements 326, 328, 330, 332, 334, 336, 338, and 340 may be coupled to the adapters 310, 312, 314, 316, 318, 320, 322, and 324.

The I/O blade device 306 may be the I/O server computer 159 of FIG. 1. As such, the I/O blade device 306 may allow uplink connectivity to an external Ethernet network 392 via an integrated switch router 301 that is coupled to transport layer modules 323, 325, 327, 329, and 331.

The transport layer modules 323, 325, 327, 329, and 331 may each couple to a bridge element 333, 335, 337, and 339. The bridge elements 333, 335, 337, and 339 may each include a forwarding cache 341, 343, 345, and 347. The I/O blade device 306 may be categorized as being included within a south portion of the distributed virtual bridge 308 because the bridge elements 333, 335, 337, and 339 may be coupled to an uplink to the Ethernet 392.

The I/O blade device 306 may include a memory 309, an operating system 391, and a processor 353 that includes the controlling bridge 348. The bridge element 339 may be coupled to the processor 353 via an Ethernet link connection 351. The transport layer module 331 may be coupled to a PCIe bus 344 that is coupled via a PCIe link connection 349 to the processor 353 and the controlling bridge 348. The PCIe bus 344 may also be coupled to a PCIe slot 393.

The controlling bridge 348 may communicate with the bridge elements 326, 328, 330, and 332-440 and other controlling bridges (not shown) of the computer system 300. The controlling bridge 348 may include firmware executing on the processor 353 that manages the bridge elements 326, 328, 330, and 332-440. For example, the controlling bridge 348 may be configured to divide a workload between the bridge elements 326, 328, 330, and 332-440, as well as perform synchronization procedures and failover operations.

The controlling bridge 348 may include the Fiber Channel Forwarder 313. FCoE may offer the capability to transport fiber channel payloads on top of an Ethernet network. The Fiber Channel Forwarder 313 may execute the Fiber Channel Initialization Protocol to discover and initialize FCoE capable entities connected to an Ethernet cloud. The Fiber Channel Forwarder 313 may further include firmware that encapsulates and de-encapsulates Fiber Channel data frames (e.g., FCoE formatted data frames). In at least one embodiment, the Fiber Channel Forwarder 313 may translate between Ethernet and Fiber Channel protocols.

The controlling bridge 348 may additionally include the global forwarding table 311. The global forwarding table 311 may include address data (e.g., MAC addresses) that is registered and maintained through communication and cooperation with the bridge elements 326, 328, 330, and 332-440, and in some cases, the hypervisors 362, 367, and 369.

In one example, the global forwarding table 311 may maintain MAC addresses that have been learned by a bridge element 326. The bridge element 326 may register the address data with the controlling bridge 348. The controlling bridge 348 may update the global forwarding table 311 by adding the address data to the global forwarding table 311. Similarly, the bridge element 326 may cause the controlling bridge 348 to update the global forwarding table 311 by sending an update message to the controlling bridge 348. The update message may cause the controlling bridge 348 to delete a MAC address that has been aged out by the bridge element 326. A MAC address may further be deleted when the bridge element 326 has detected that the address data is no longer valid.

In another example, the hypervisor virtual bridge 364 may register MAC addresses or other address data with the controlling bridge 348. The global forwarding table 311 may include address data associated with addresses that are included within the system 300, as well as addresses that are external to the system 300.

FIG. 3 thus shows an embodiment of a system 300 that includes a distributed virtual bridge 308 configured for lossless, point-to-point, in-order data frame delivery. The system 300 may support Fiber channel over Ethernet (FCoE) and may be scalable to include hundreds or more server computers. A data frame may be forwarded to the distributed Fiber Channel Forwarders 313, 398 to reduce routing contention and processing complexity.

Figure 4:
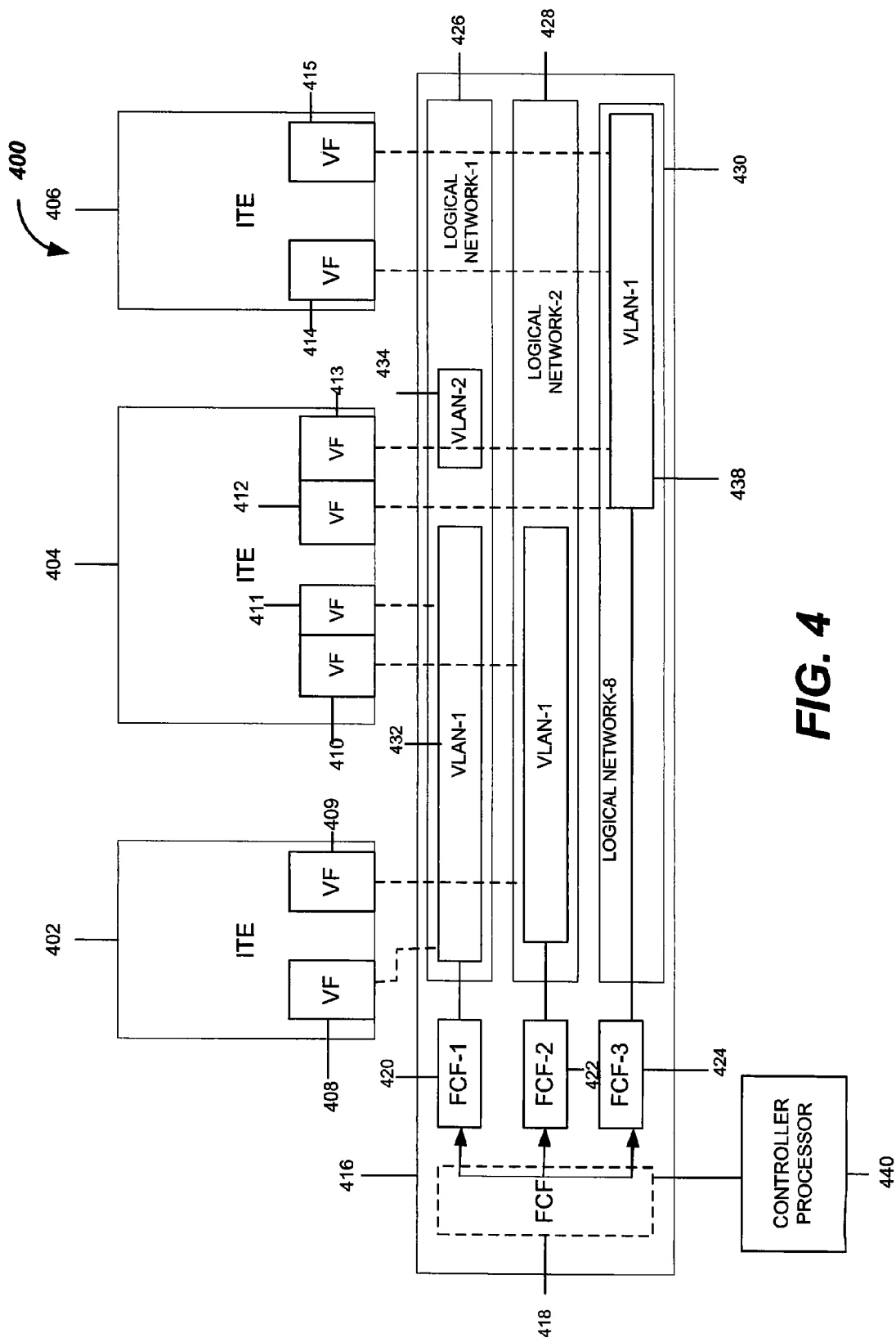
FIG. 4 is a diagram showing a logical representation of processes that forward data frames to multiple, distributed Fiber Channel Forwarders.

FIG. 4 is a block diagram that illustrates a logical diagram of a distributed Fiber Channel Forwarder system 400. The system 400 includes ITEs 402, 404, and 406 that are coupled to a distributed virtual bridge 416. The distributed virtual bridge 416 may be similar to the distributed virtual bridge 206 of FIG. 2. The ITEs 402, 404, and 406 may include virtual functions 408-415. A virtual function may comprise a virtualized interface to a virtual machine.

The distributed virtual bridge 416 may include a global Fiber Channel Forwarder function 418. The global Fiber Channel Forwarder function 418 may represent a global address to which data frames from the ITEs 402, 404, and 406 are directed. Data frames addressed to the global Fiber Channel Forwarder function 418 may be routed to one of a first Fiber Channel Forwarder 420, a second Fiber Channel Forwarder 422, and a third Fiber Channel Forwarder 424. The Fiber Channel Forwarders 420, 422, and 424 may be similar to the Fiber Channel Forwarders 222, 228, and 234 of FIG. 2.

The distributed virtual bridge 416 may include multiple Layer 2 domains in which data frames are forwarded and contained. For example, the distributed virtual bridge 416 may include logical networks 426, 428, and 430. As described herein, data frame traffic within the logical networks 426, 428, and 430 may be segregated. Data may not be shared between the different logical networks 426, 428, and 430. Similarly, VLANs 432, 434, 436, and 438 may be associated with the logical networks 426, 428, and 430 and may be segregated from other VLANs. Data may not be shared between the VLANs 432, 434, 436, and 438.

The first Fiber Channel Forwarder 420 may forward a data frame to the first VLAN 432 of the first logical network 426. The virtual function 408 of the ITE 402 and the virtual function 411 may interface with the first VLAN 432. The first logical network 426 may additionally include the second VLAN 434.

The second Fiber Channel Forwarder 422 may forward a data frame to the first VLAN 436 of the second logical network 428. The virtual function 409 of the first ITE 402 and the virtual function 410 of the second ITE 404 may interface with the VLAN 436.

The third Fiber Channel Forwarder 424 may forward a data frame to the first VLAN 438 of the third logical network 430. The virtual functions 412, 413 of the second ITE 404 and the virtual functions 414, 415 of the third ITE 406 may interface with the first VLAN 438. As shown in FIG. 4, a control processor 440 may be coupled to the distributed virtual bridge 416.

FIG. 4 shows a logical representation of a system 400 where data frames are distributed to multiple Fiber Channel Forwarders 420, 422, and 424. The data frames may be addressed to the global Fiber Channel Forwarder 418. Each Fiber Channel Forwarder 420, 422, and 424 may route the data frames within respective domains that include the logical networks 426, 428, and 430 and the VLANs 432, 434, 436, and 438.

Figure 5:
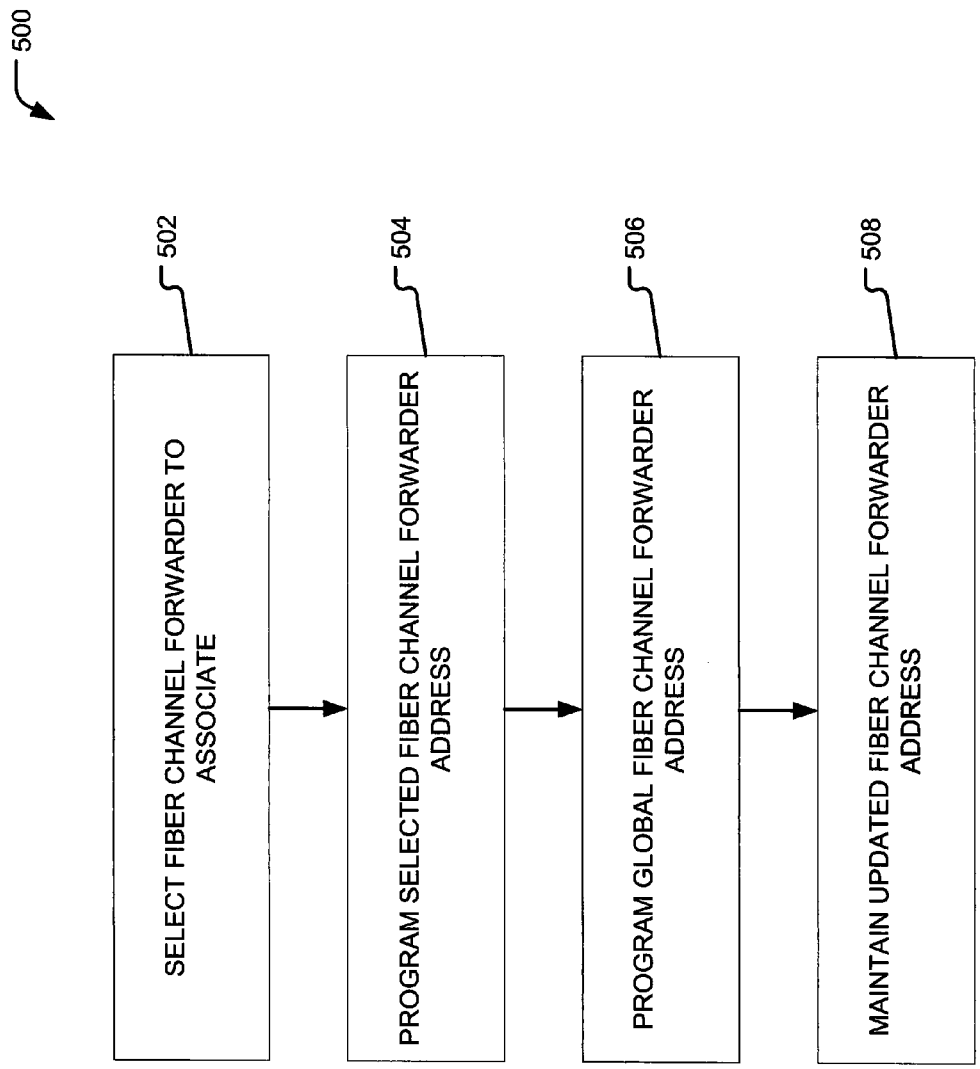
FIG. 5 is a flow diagram of a particular embodiment of a method to program a bridge element to forward data frames to a distributed Fiber Channel Forwarder.

FIG. 5 is a flow diagram of an embodiment of a method of programming a bridge element to forward a data frame and is generally designated 500. In a particular embodiment, the method 500 is performed by at least one of the controlling bridges 220, 226, and 232 of the system 200 of FIG. 2.

At 502, a Fiber Channel Forwarder to be associated with a bridge element may be selected. For example, the bridge element 212 of FIG. 2 may be associated with the Fiber Channel Forwarder 234. The controlling bridge 232 may associate the Fiber Channel Forwarder 234 since the Fiber Channel Forwarder 234 is nearest to the bridge element 212.

The address of the selected Fiber Channel Forwarder may be programmed into the bridge element, at 504. For instance, the controlling bridge 232 may program the address of the Fiber Channel Forwarder 234 of FIG. 2 into the bridge element 212 of FIG. 2.

At 506, the global Fiber Channel Forwarder address may be programmed into the bridge element. For example, the controlling bridge 232 of FIG. 2 may program the bridge element 212 to recognize the global Fiber Channel Forwarder address. The bridge element 212 may forward a data frame having the global Fiber Channel Forwarder address to the associated Fiber Channel Forwarder 234.

The address of the Fiber Channel Forwarder may be updated, at 508. For instance, the controlling bridge 232 of FIG. 2 may automatically program the bridge element 212 with an updated address of an associated Fiber Channel Forwarder. For example, the Fiber Channel Forwarder that is associated with a bridge element may change when hardware is added or removed from a system.

Figure 6:
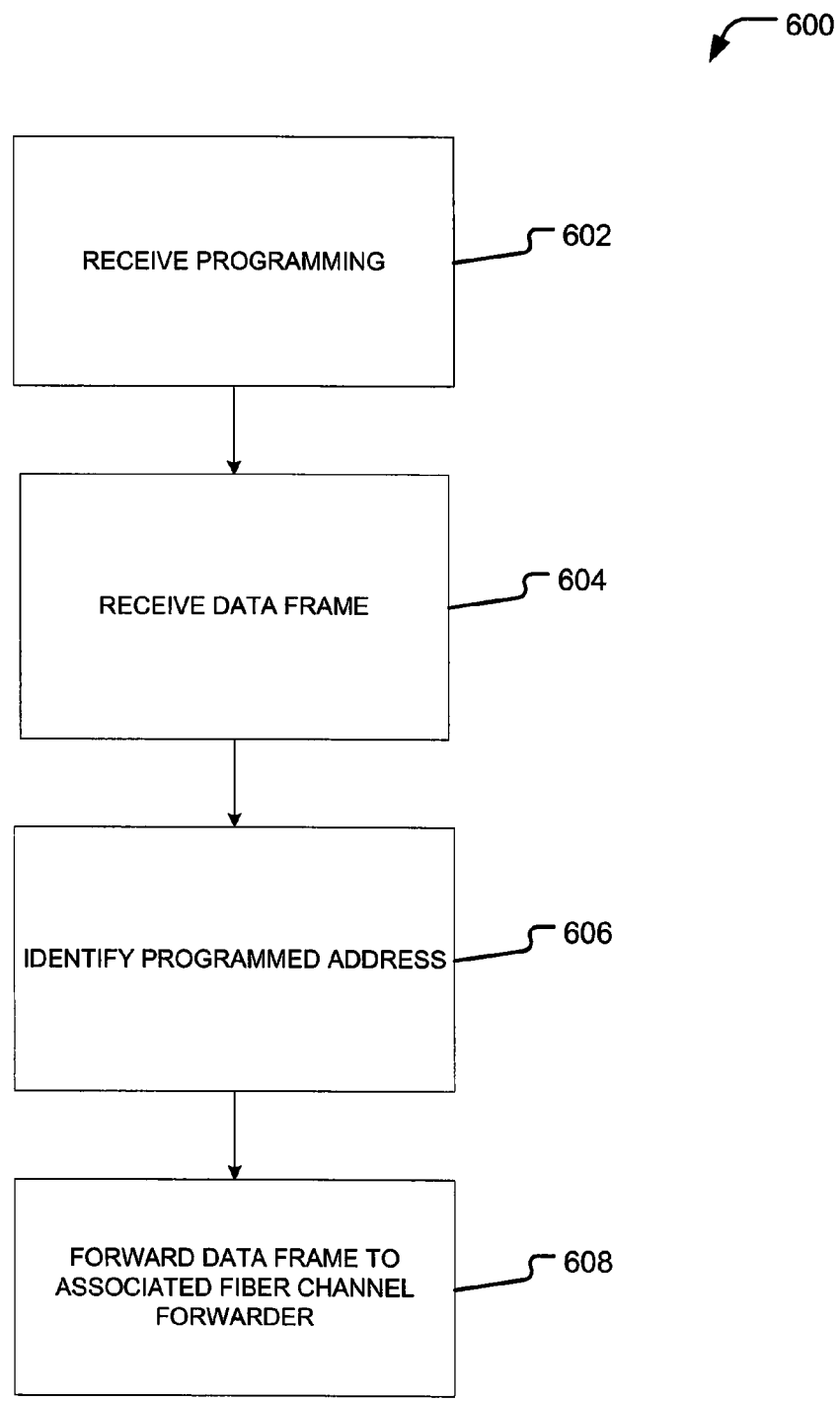
FIG. 6 is a flow diagram of a particular embodiment of a method to forward data frames to a distributed Fiber Channel Forwarder.

FIG. 6 is a flow diagram of an embodiment of a method of forwarding a data frame and is generally designated 600. In a particular embodiment, the method 600 is performed by at least one of the bridge elements 208, 210, 212, and 214 of the system 200 of FIG. 2.

At 602, a bridge element may receive programming to facilitate the routing of data frames to distributed Fiber Channel Forwarders. For example, the bridge element 208 may receive program instructions from the controlling bridge 226 of FIG. 2. The programming may include address forwarding data, as described in the method 500 of FIG. 5.

The bridge element may receive a data frame, at 604. For instance, the bridge element 208 of FIG. 2 may receive a data frame from the source ITE 202.

At 606, the bridge element may identify a programmed address included within the data frame. For example, the bridge element 208 of FIG. 2 may recognize that the data frame includes the global Fiber Channel Forwarder address.

The bridge element may forward the data frame to the associated Fiber Channel Forwarder, at 608. For instance, the bridge element 208 of FIG. 2 may forward a data frame to the Fiber Channel Forwarder 228 associated with the bridge element 208.

FIG. 6 thus shows a method 600 of forwarding a data frame to distributed Fiber Channel Forwarders. The method 600 includes programming a bridge element, or other switch, to identify a data frame having a predetermined address (e.g., the global Fiber Channel Forwarder address). The data frame may be forwarded to a Fiber Channel Forwarder associated with the bridge element. In this manner, data and processing may be distributed throughout a plurality of Fiber Channel Forwarders to increase processing speed and routing efficiency.

Particular embodiments described herein may take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments may take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method of forwarding a data frame, the method comprising:
receiving programming at a bridge element of a plurality of bridge elements from a controlling bridge configured to program the plurality of bridge elements, wherein the programming includes:
an address of a fiber channel forwarder to associate with the bridge element, the fiber channel forwarder selected by the controlling bridge from a plurality of fiber channel forwarders coupled to the bridge element, and
a global fiber channel forwarder address to identify data frames to forward to the fiber channel forwarder, wherein the global fiber channel forwarder address is common to the plurality of fiber channel forwarders;
associating the fiber channel forwarder with the bridge element based on the programming received from the controlling bridge, wherein the bridge element is a hardware component and remote from the fiber channel forwarder; and
forwarding a data frame received at the bridge element to the fiber channel forwarder associated with the bridge element in response to recognizing the global fiber channel forwarder address included within the data frame.

2. The method of claim 1, wherein associating the fiber channel forwarder with the bridge element further comprises associating the address of the fiber channel forwarder with the bridge element.

3. The method of claim 1, further comprising storing the global fiber channel forwarder address at the bridge element.

4. The method of claim 1, further comprising receiving the data frame at the bridge element.

5. The method of claim 1, wherein the plurality of fiber channel forwarders are interconnected.

6. The method of claim 1, wherein the fiber channel forwarder is associated with at least one of a virtual large area network and a logical network.

7. An apparatus comprising:
a plurality of fiber channel forwarders each configured to encapsulate and de-encapsulate data frame data;
a bridge element of a plurality of bridge elements of a distributed virtual bridge in communication with the plurality of fiber channel forwarders; and
a controlling bridge of a plurality of controlling bridges configured to program the plurality of bridge elements, wherein the bridge element is configured to:
receive programming from the controlling, wherein the programming includes:
an address of a fiber channel forwarder to associate with the bridge element, the fiber channel forwarder selected by the controlling bridge from the plurality of fiber channel forwarders, and
a global fiber channel forwarder address to identify data frames to forward to the fiber channel forwarder;
associate the fiber channel forwarder with the bridge element based on the programming received from the controlling bridge, wherein the bridge element is a hardware component and remote from the fiber channel forwarder; and
forward a data frame received at the bridge element to the fiber channel forwarder associated with the bridge element in response to recognizing the global fiber channel forwarder address included within the data frame.

8. The apparatus of claim 7, wherein each rack of a plurality of racks includes a plurality of chassis, wherein each chassis of the plurality of chassis includes a plurality of server computers, wherein the distributed virtual bridge is coupled to the plurality of server computers, wherein the distributed virtual bridge is coupled to a plurality of adapters, wherein the plurality of adapters is located within or coupled to the plurality of server computers, and wherein the distributed virtual bridge comprises:

the plurality of bridge elements coupled to the plurality of server computers, wherein each bridge element of the plurality of bridge elements is configured to forward data frames between the plurality of server computers of different racks of the plurality of racks, different chassis of the plurality of chassis, or any combination thereof, and wherein each of the plurality of bridge elements includes a forwarding cache to store address data used to forward the data frames received by the bridge element, and the plurality of controlling bridges coupled to one another and coupled to the plurality of bridge elements, wherein each controlling bridge of the plurality of controlling bridges includes a global forwarding table to store address data received from the plurality of bridge elements, to provide address data to the plurality of bridge elements, or any combination thereof.

9. The apparatus of claim 7, wherein the fiber channel forwarder is selected by the controlling bridge from among the plurality of fiber channel forwarders based upon predetermined criteria.

10. The apparatus of claim 7, wherein the fiber channel forwarder is selected by the controlling bridge based upon a proximity to the bridge element.

11. The apparatus of claim 7, wherein the address of the fiber channel forwarder is accessible to the bridge element.

12. A program product, comprising: program code configured to be executed to on a non-transitory computer readable medium bearing the program code: receive programming at a bridge element of a plurality of bridge elements of a distributed virtual bridge from a controlling bridge of a plurality of controlling bridges configured to program the plurality of bridge elements, wherein the programming includes: an address of a fiber channel forwarder to associate with the bridge element, the fiber channel forwarder selected by the controlling bridge from a plurality of fiber channel forwarders coupled to the bridge element, and a global fiber channel forwarder address to identify data frames to forward to the fiber channel forwarder, wherein the global fiber channel forwarder address is common to the plurality of fiber channel forwarders; associate the fiber channel forwarder with the bridge element based on the programming received from the controlling bridge, wherein the bridge element is a hardware component and remote from the fiber channel forwarder; forward a data frame received at the bridge element to the fiber channel forwarder associated with the bridge element in response to recognizing the global fiber channel forwarder address included within the data frame.

13. The method of claim 1, wherein the data frame is a Fiber Channel over Ethernet data frame.

14. The method of claim 1, wherein the fiber channel forwarder is selected by the controlling bridge based on at least one of predetermined criteria, a proximity to the bridge element, or nearest to the bridge element.

15. The apparatus of claim 7, wherein associating the fiber channel forwarder with the bridge element further comprises associating the address of the fiber channel forwarder with the bridge element.

16. The apparatus of claim 7, further comprising storing the global fiber channel forwarder address at the bridge element.

17. The apparatus of claim 7, further comprising receiving the data frame at the bridge element.

18. The apparatus of claim 7, wherein the plurality of fiber channel forwarders are interconnected.

19. The apparatus of claim 7, wherein the fiber channel forwarder is associated with at least one of a virtual large area network and a logical network.

20. The apparatus of claim 7, wherein the fiber channel forwarder is selected by the controlling bridge because the fiber channel forwarder is nearest to the bridge element.

* * * * *